Oct. 24, 1950     A. F. BISCHOFF     2,527,209
STORAGE BATTERY

Filed April 6, 1948

Inventor:
Alfred F. Bischoff,
by Merton O Mann
His Attorney.

Patented Oct. 24, 1950

2,527,209

UNITED STATES PATENT OFFICE 2,527,209

STORAGE BATTERY

Alfred F. Bischoff, Ballston Spa, N. Y., assignor to General Electric Company, a corporation of New York Application April 6, 1948, Serial No. 19,285

3 Claims. (Cl. 136—162)

This invention relates to electrical batteries and more particularly to multiple cell storage batteries of the high potential type.

It is an object of this invention to provide such a storage battery for use in portable battery powered radio receiving systems and the like, whereby the high potential requirements of such systems are supplied, and the need for the usual power transformer and vibrator arrangements therein is precluded.

It is a further object of this invention to provide a new and improved multi-cell storage battery which is so arranged that, when required, distilled water may be added through a single fill hole to the many cells which make up the battery, obviating the need to fill these cells individually.

The features of this invention which are believed to be new are set forth with particularity in the appended claims. The invention itself, however, together with further objects and advantages may best be understood by reference to the following description when taken in conjunction with the accompanying drawing, in which, Fig. 1 shows a top plan view of the proposed storage battery, Fig. 2 shows a side elevation of the battery, and Fig. 3 shows a section of one of the cells which make up the battery.

Figure 1:
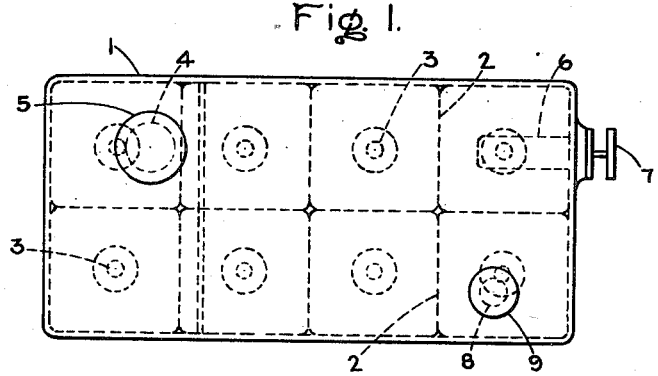

Referring now to Fig. 1, the proposed storage battery may be contained in a usual molded case 1, and comprises a number of individual cells 2. Each of the cells 2 has a small, open, fill hole 3 formed therein. Case 1 is provided with a fill hole 4 which may be closed by the usual screw type cover 5. A simple pump 6 is mounted within case 1 for purposes to be described, pump 6 having an operating handle 7 extending through the case. A gas vent 8 is shown formed in the case 1, this vent having a cover 9. Cover 9 is removed during normal operation of the battery. The vent 8 may be of any known type, and may be equipped with a conventional valve arrangement in place of cover 9. Furthermore, the fumes emitted by vent 8 may be carried to the atmosphere or other receiving means by way of a tube or pipe line, or the like.

Figure 2:
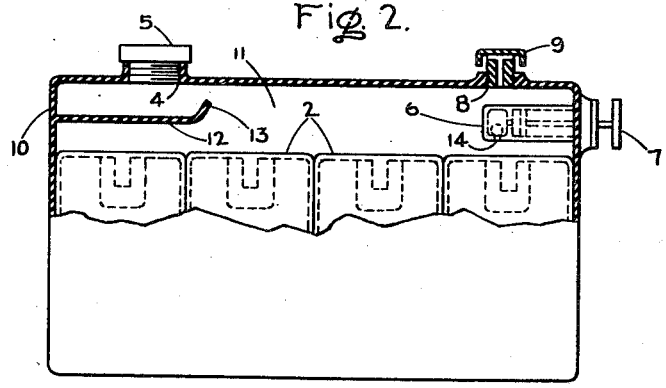
Figure 3:
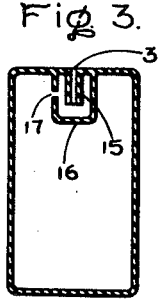

Referring now to Fig. 2, it can be seen that a portion of case 1 extends beyond the cells 2, forming an airtight superstructure 10. Superstructure 10 forms an air space 11 above the cells 2, and this superstructure is provided with the previously mentioned battery fill hole 4 and gas vent 8. A water well 12 is mounted on superstructure 10, this well being directly below fill hole 4 and having a lip 13 on one side thereof, as shown. Pump 6 contains a valve 14, and reciprocating action of handle 7 causes the air pressure in space 11 to increase or decrease.

The battery may be filled as follows: The battery fill hole cover 5 is removed and distilled water is poured into the well 12 through fill hole 4. The fill hole cover 5 and gas vent cover 9 are then replaced, and a slight vacuum may be drawn in air space 11 by means of pump 6. In this way, a quantity of air is drawn out of each of the cells 2, the quantity of air withdrawn from each cell being inversely proportional to the levels of the electrolyte contained in the respective cells. By tilting the battery, or by other means, water in well 12 is caused to flow from the well into the air space 11 so that it covers cells 2 and the corresponding fill holes 3. A slight pressure is then imparted to air space 11 by means of pump 7 or by removal of covers 5 or 9, and this pressure forces the distilled water into the individual cells 2 through respective fill holes 3, the amount of water being forced into each cell being dependent upon the level of the electrolyte therein, as previously described. Excess water in air space 11 may be removed, for example, by removing cover 5 and tilting the battery so that the excess water flows through fill hole 4. Cover 5 is then replaced and cover 9 of gas vent 8 removed, and the battery is now in condition for normal operation.

The cells 2 are each equipped with an antispill device, as shown in Fig. 3, so that the electrolyte contained in these cells remains therein when the battery is tilted during the filling process, and also to avoid spilling due to the motion of the battery during the normal operation.

Referring now to Fig. 3, a tube 15 surrounds the fill holes 3, as shown, tube 15 being formed integral with the sides of cell 2 if so desired. A closed cylinder 16 is mounted concentric to tube 15, cylinder 16 having a small orifice 17 formed in one side thereof. This anti-spill arrangement allows distilled water to be forced under pressure into the cell 2 through fill hole 3, but does not allow any of the electrolyte contained in the cell to spill from the fill hole during normal handling and motion of the battery.

This invention, therefore, provides a high potential storage battery for use with portable battery powered radio receivers and the like, in which the distilled water filling procedure is greatly simplified, and the need for individually filling the many cells which make up the battery is precluded.

While a certain specific embodiment has been shown and described, it will of course be understood that various modifications may be made without departing from the invention. The appended claims are, therefore, intended to cover any such modifications within the true spirit and scope of the invention.

What I claim as new and desire to secure by Letters Patent of the United States is:

1. In a storage battery comprising a plurality of individual battery cells, said cells having open fill holes respectively formed therein, an airtight structure enclosing said cells, said structure having an integral superstructure forming an air space above said cells, means for inserting fluid into said individual cells, said means including a common fill hole formed in said superstructure, a well comprising a shelf attached to said superstructure and positioned below said common fill hole in said air space, means for causing fluid from said well to cover said first-mentioned fill holes, and means including a pump supported on said superstructure for increasing the pressure in said air space to force said fluid into said cells through the fill holes respectively associated therewith.

2. In a storage battery comprising a plurality of individual battery cells, said cells having open water fill holes respectively formed therein, means associated with said fill holes for substantially preventing electrolyte in said cells from escaping therefrom, an airtight structure enclosing said cells, said structure having an integral superstructure forming an air space above said cells, means for inserting water into said individual cells, said last-mentioned means including a common water fill hole formed in said superstructure, a water well comprising a shelf attached to said superstructure and positioned below said common fill hole in said air space, means for causing water from said well to cover said first-mentioned water fill holes, and means including a pump supported on said superstructure for increasing the pressure in said air space to force said water into said cells through the fill holes respectively associated therewith.

3. In a storage battery comprising a plurality of individual battery cells, said cells having open fill holes respectively formed therein, an airtight structure enclosing said cells, said structure having an integral superstructure extending beyond said cells and forming an air space above said cells, means for inserting fluid into said individual cells, said means including a common fill hole formed in said superstructure, a well comprising a shelf attached to said superstructure and positioned below said common fill hole in said air space, means including a pump supported on said superstructure for evacuating a portion of the air from said air space and hence from said individual cells, means for causing fluid from said well to cover said first-mentioned fill holes, and means for increasing the pressure in said air space to force said fluid into said cells through the fill holes respectively associated therewith.

ALFRED F. BISCHOFF.

REFERENCES CITED

The following references are of record in the file of this patent:

UNITED STATES PATENTS

| Number | Name | Date |
|---|---|---|
| 1,198,619 | Clymer | Sept. 19, 1916 |
| 1,301,780 | Lotsch | Apr. 22, 1919 |
| 1,327,121 | Sturges | Jan. 6, 1920 |
| 1,380,770 | Carpenter | June 7, 1921 |
| 1,404,024 | Harris | Jan. 17, 1922 |

FOREIGN PATENTS

| Number | Country | Date |
|---|---|---|
| 12,045 | Great Britain | of 1894 |
| 333,291 | Great Britain | Aug. 11, 1930 |